United States Patent
Nishio et al.

(10) Patent No.: US 7,029,128 B2
(45) Date of Patent: Apr. 18, 2006

(54) TABLE TYPE DISPLAY DEVICE

(75) Inventors: Tadashi Nishio, Iruma (JP); Ikuharu Sadano, Hachioji (JP); Atsutoshi Yokota, Kamiina-Gun (JP); Takanori Ishizawa, Tachikawa (JP)

(73) Assignee: Olympus Optical Co., Ltd., Tokyo (JP)

( * ) Notice: Subject to any disclaimer, the term of this patent is extended or adjusted under 35 U.S.C. 154(b) by 73 days.

(21) Appl. No.: 10/454,910

(22) Filed: Jun. 4, 2003

(65) Prior Publication Data

US 2004/0057024 A1    Mar. 25, 2004

(30) Foreign Application Priority Data

Jun. 5, 2002    (JP) .............................. 2002-164775

(51) Int. Cl.
| | | |
|---|---|---|
| G03B 21/26 | (2006.01) | |
| G03B 21/28 | (2006.01) | |
| G03B 21/60 | (2006.01) | |
| G03H 1/02 | (2006.01) | |
| G02F 1/1335 | (2006.01) | |

(52) U.S. Cl. ........................... 353/94; 353/22; 353/78; 353/79; 353/99; 353/119; 353/122; 359/28; 359/449; 359/455; 359/599; 359/621; 349/64; 349/112; 349/113

(58) Field of Classification Search ................. 353/94, 353/20, 22, 31, 32, 37, 38, 74, 75, 77–79, 353/97–99, 119, 122; 348/40, 59, 744, 750, 348/771, 781–783; 359/1, 10, 14, 28, 250, 359/342, 343, 443, 449, 454, 455, 459, 460, 359/463, 513, 599, 619, 621, 707, 838, 884; 349/5, 7, 9, 64, 112, 113
See application file for complete search history.

(56) References Cited

U.S. PATENT DOCUMENTS

| | | | |
|---|---|---|---|
| 5,457,508 A | 10/1995 | Ichihara et al. | |
| 5,897,192 A | 4/1999 | Seufert | |
| 5,902,030 A | 5/1999 | Blanchard | |
| 6,407,859 B1* | 6/2002 | Hennen et al. | 359/454 |
| 6,478,432 B1 | 11/2002 | Dyner | |
| 6,607,275 B1 | 8/2003 | Cimini et al. | |
| 2001/0022651 A1* | 9/2001 | Kubota et al. | 353/94 |

(Continued)

FOREIGN PATENT DOCUMENTS

JP    09-326981 A    12/1997

(Continued)

*Primary Examiner*—W. B. Perkey
*Assistant Examiner*—Rochelle Blackman
(74) *Attorney, Agent, or Firm*—Frishauf, Holtz, Goodman & Chick, P.C.

(57) ABSTRACT

A table type display device, in which a high resolution display with an unremarkable connection is realized at the time of large screen display by using a screen with a composition having few bending is described. In a table type display device comprising plural M of projectors 1L, 1R for projecting luminous flux to form an image, plural N of reflection mirrors 2L, 2R for bending optical paths of luminous fluxes projected from respective plural M of projectors 1L, 1R, screen 3 of horizontal installation type for projecting luminous fluxes for which optical path is bent, by the plurality N of reflection mirrors 2L,2R onto the predetermined region, respectively, the screen comprises a transparent base member 7 for reducing flexure of the screen, optical sheet 9 substantially for making luminous fluxes projected respectively from the plural M of projectors 1L,1R uniform, and a diffusing screen for imaging the image.

21 Claims, 15 Drawing Sheets

U.S. PATENT DOCUMENTS

2004/0068736 A1\* 4/2004 Lafon et al. .................. 725/1
2004/0080720 A1 4/2004 Saio
2004/0109145 A1 6/2004 Nishio et al.

FOREIGN PATENT DOCUMENTS

JP 2000-305079 A 11/2000

\* cited by examiner

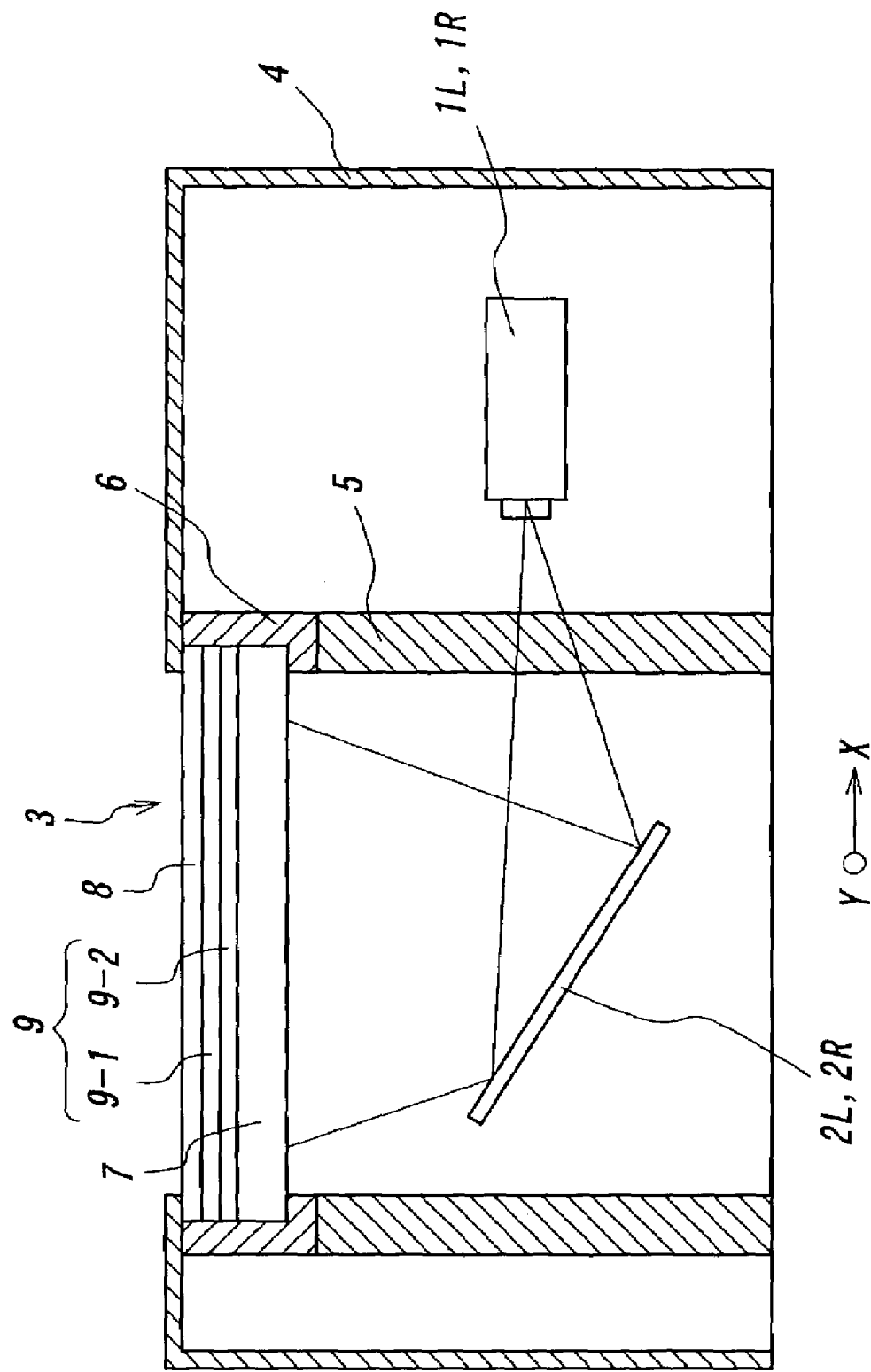

TABLE TYPE DISPLAY DEVICE

BACKGROUND OF THE INVENTION

1. Field of the Invention

The present invention relates to a table type display device capable of achieving high resolution display at the time of displaying the large screen, by projecting luminous flux for the image formation from a plurality of projectors on the screen of the horizontal location type.

2. Related Art Station

As a conventional table type display device to project the luminous flux to form the image on the screen of the horizontal location type, for example, there are the device of the type displaying images on the LCD panel, and device of type shown in FIG. 18, by burying one LCD panel of the order of 10–14 inches in a horizontal plane of a table-like casing. The conventional table type display device shown in FIG. 18 corresponds to the device described in FIG. 3 of Japanese Patent Laid-open No. 305,079/2000, and comprises one projector 51 for projecting luminous flux to form an image, two reflection mirrors 52 and 53 for bending an optical path of luminous flux projected from the projector 51 twice, and a transparent screen 54 of the horizontal location type, from which luminous flux bent two times, is projected to an optical path by these reflection mirrors 52 and 53, which are built in a same casing 55, the casing 55 is constituted in the shape of the desk, and a transparent screen 54 constitutes the desk plane (table plane).

The conventional table type display device show in FIG. 18 adopts a construction in which the luminous flux projected from one protector 51 is projected through two reflection mirrors 52 and 53 on a transparent screen 54, so that resolution of the projector and displaying resolution on the screen are the same. Therefore, for example, even in case of utilizing a projector with the resolution of XGA (1024× 798 pixels), the resolution on the screen becomes only XGA, and when the screen is made a large screen, the displayed image rather becomes unclear and becomes hard to see. Therefore, in the above conventional display device, it is difficult to achieve the high resolution display at the time of displaying the large screen.

In the display device, as a method of achieving high resolution display at the time of displaying large screen, for example, as described in Japanese Patent Application Opened No. 326981/1997, which has been filed previously by the present applicant, there is a method of displaying one image on the entire screen, by projecting the luminous fluxes to form the images from a plurality of projectors to a predetermined region of the screen constituted to the large screen respectively.

When the screen constituted to the large screen, is horizontally located to constitute the table type display device, the screen is bent by the self-weight of the screen, and is bent by loading a part or all of the weight of the viewer on the screen. In that case, the display image is distorted and blurred, and thus the display quality is deteriorated, so that the flexure of the screen must be reduced.

Moreover, in case of projecting the luminous flux to form the image from a plurality of projectors to a predetermined region of the screen constituted to the large screen, respectively, the incident angle of luminous fluxes in the periphery of respective regions becomes large compared with the incident angle of luminous flux in a central portion thereof, so that the boundary of the adjoining area looks dark, and the connection stands out, and thus the visual performance of the display image is different according to the standing position of the viewer.

SUMMARY OF THE INVENTION

The present invention has for its first object to provide a table type display device for realizing high resolution display at the time of displaying the large screen, by using a screen with construction of less bending. The present invention has for its second object to provide a table type display device for realizing high resolution display with unremarkable connection at the time of displaying the large screen, by using a screen with construction of less bending.

In order to achieve the above first object, a first invention is provided in which a table type display device comprises a plurality of projectors for projecting luminous flux to form an image, a plurality of reflection mirrors for bending optical paths of the luminous flux projected from respective projectors, and a horizontally installed screen onto which the light reflected by the plurality of reflection mirrors is projected. The plurality of reflection mirrors reflect the light onto respective predetermined regions of the screen. The screen includes a transparent base member for reducing flexure of the screen, and a diffusing screen for imaging the image.

In order to achieve the above second object, a second invention is provided in which a table type display device comprises a plurality of projectors for projecting luminous flux to form an image, a plurality of reflection mirrors for bending optical paths of the luminous flux projected from respective projectors, and a horizontally installed screen onto which the light reflected by the plurality of reflection mirrors is projected. The plurality of reflection mirrors reflect the light onto respective predetermined regions of the screen. The screen includes a transparent base member for reducing flexure of the screen, an optical sheet for making luminous fluxes transmitted therethrough substantially uniform, and a diffusing screen for imaging the image.

A third invention is provided in which a table type display device comprises a plurality of projectors for projecting luminous flux to form an image, a plurality of reflection mirrors for bending optical paths of the luminous flux projected from respective projectors, and a horizontally installed screen onto which the light reflected by the plurality of reflection mirrors is projected. The plurality of reflection mirrors reflect the light onto respective predetermined regions of the screen. The screen includes a transparent base member for reducing flexure of the screen, an optical sheet for making luminous fluxes transmitted therethrough substantially uniform, a diffusing screen for imaging the image, a transparent spread sheet for imaging the image, and a cover plate for guarding the spread sheet.

It is preferable that the optical sheet is one of: (a) a Fresnel lens, (b) lenticular sheet, (c) a structure formed by a lenticular sheet constituted by arranging lenses in one direction of two dimensional directions of display surface of the diffusing screen and a lenticular sheet constituted by arranging lenses in the other direction of the two dimensional directions, (d) a bead screen, and (e) a holography screen, in order to make the luminous fluxes uniforms. Moreover, it is preferable that the optical sheet is constituted to form a scaled structure by the transparent base member, the diffusing screen, and the above screen frame, in order to prevent the optical sheet from expanding and contracting along with moisture absorption.

It is preferable that the transparent base member is one of: (a) a laminated glass, (b) a thermal reinforced glass and (c) an acrylic board, in order to reduce the flexure of the above screen.

The diffusing screen is formed by providing a diffused layer to the laminated glass, the thermal reinforced glass or the acrylic plate, so that the diffusing screen serves as a transparent screen, and to secure the safety at a time of breakage in case of using the glass as a component.

It is preferable that the above cover glass is a laminated glass, a thermal reinforced glass, or an acrylic plate, in order to guard the diffusing sheet at the time of glass breakage.

It is preferable that a predetermined amount of tension is applied to the optical sheet and the diffusing sheet, in order to prevent loosening.

It is preferable that the cover glass is arranged on the top of the device, and is cemented to the screen frame to hold various members located on the lower layer of the cover glass, by a sealing material, in order to prevent the surface of the screen from becoming dirty and from being damaged, and in case of spilling the liquid on the screen, to prevent the liquid from being made wraparound on the diffusing screen.

It is preferable that the cover glass is constituted to be exchangeable alone, in order to facilitate maintenance.

In the first invention, after the optical path is bent by the plurality of reflection mirrors, the luminous fluxes projected respectively by the plurality of projectors are projected to respective predeterminated regions of the screen. The screen comprises the transparent base member for reducing the flexure of the screen and the diffusing screen for imaging the image, so that even in case of making the screen large, flexure of the screen can be minimized. Therefore, a table type display device can be provided in such a manner that when the large screen display is performed with the use of the screen having the structure with little bending, a high resolution display can be achieved.

In the second invention, after the optical path is bent by the plurality of reflection mirrors, the luminous fluxes projected respectively by the plurality of projectors are projected to respective predetermined regions of the screen. The screen comprises the transparent base member for reducing the flexure of the screen, the optical sheet for making the luminous fluxes substantially uniform, and the diffusing screen for imaging the image, so that even in case of making the screen large, flexure of the screen can be minimized, and the luminous flux projected to the diffusing screen is made substantially uniform. Therefore, a table type display device can be provided in such a manner that when a large screen display is performed with the use of the screen having a structure with little bending, an easily visible high resolution display, in which connection of the predetermined regions is unremarkable, can be achieved.

In the third invention, after the optical path is bent by the plurality of reflection mirrors, the luminous fluxes projected respectively by the plurality of projectors are projected to respective predetermined regions of the screen. The screen comprises the transparent base member for reducing the flexure of the screen, the optical sheet for making the luminous fluxes substantially uniform the transparent diffusing sheet for imaging the image, and the cover glass for guarding the diffusing sheet, so that even in case of making the screen large, flexure of the screen can be minimized, and the luminous flux projected to the diffusing screen is made substantially uniform. Therefore, a table type display device can be provided in such a manner that when the large screen display is performed with the use of the screen having the structure with little bending, an easily visible high resolution display, in which connection of the predetermined regions is unremarkable, can be achieved.

BRIEF DESCRIPTION OF DRAWINGS

FIG. 8 is a cross-sectional view showing the structure of the table type display device of third embodiment according to the present invention;

DESCRIPTION OF THE PREFERRED EMBODIMENTS

Figure 1:
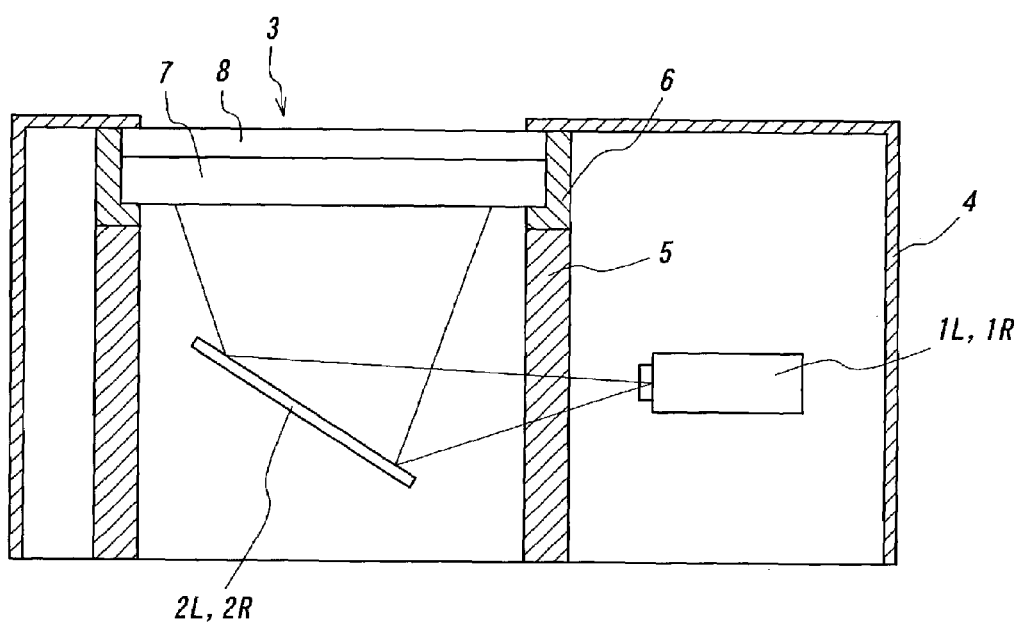
FIG. 1 is a cross-sectional view showing the structure of the table type display device of the first embodiment according to the present invention.

Hereafter, the embodiments of the present invention are explained in detail with reference to the drawing. FIG. 1 is a cross-sectional view showing a structure of the principal portion of the table type display device of first embodiment according to the present invention. The table type display device according to the present embodiment comprises, as shown in the FIG. 1, a plurality M of projectors 1L and 1R of rear projection system (two in the shown embodiment) for projecting luminous flux to form an image, a plurality M of reflection mirrors 2L and 2R (N=M=2 in shown embodiment) for bending the optical path of luminous flux projected from projectors 1L and 1R, respectively, a screen 3 of the horizontal location type for projecting luminous flux for which optical path is bent by the reflection mirrors 2L and 2R on the predetermined region, respectively, a casing 4 of table type for storing respective constituent elements, a frame 5 connected in the interior of the casing 4, and a screen frame 6 connected to the upper part of the frame 5, and the above screen 3 comprises a transparent base member 7 to reduce the flexure of the screen and a diffusing screen 8 for imaging the image. The reflection mirrors 2L and 2R are supported to the frame 5 or the like in the casing 4 by a support member (not shown). Moreover, in the case of horizontally locating the projectors 1L and 1R, the reflection mirrors 2L and 2R may use one large common mirror instead of two reflection mirrors 2L and 2R.

The projectors 1L and 1R are supported horizontally with a support member (not shown) in the casing 4. The projectors 1L and 1R utilize a projector with high resolution, in this embodiment, a projector with resolution of SXGA (1280*1024 pixels) is used, but instead a projector with resolution of XGA (1024*768 pixels) may use. Moreover, the projectors 1L and 1R are arranged so as to project luminous flux to the entire right and left half plane regions formed by dividing the diffusing screen 8 by two in back and forth direction of FIG. 1, respectively. In this case, luminous flux may display with overlap thereof in the adjacent portion of the half plane region, and may display without the overlap, but in case of displaying luminous flux with overlap, the resolution in the entire display becomes small more than two (2048*1280 pixels).

Transparent members such as the glass and acrylic resin can be used as the transparent base member 7, and a thermal reinforced glass or an acrylic board is used preferably. The thickness of the transparent base member 7 is decided in consideration of the load added to the upper portion of the member 7, and assuming that the viewer gets on screen 3, the transparent base member 7 having thickness in such a manner that the screen 3 does not flexure, is selected, when the total load that adds a predetermined margin to the average weight of the adult male for example (about 63 Kg) is loaded.

The diffusing screen formed by providing the diffused layer to the laminated glass, or the diffusing screen formed by providing the diffused layer to the thermal reinforced glass, or the diffusing screen formed by providing the diffused layer to an acryl plate, is used for the diffusing screen 8, in order to serve as a transparent screen and to secure the safety at the time of breakage in case of using the glass as a component.

Moreover, in order to prevent the flaw from being formed on the surface of the screen a glass or an acrylic plate with a hard coating thereon may use as a component of the diffusing screen 8.

Figure 2:
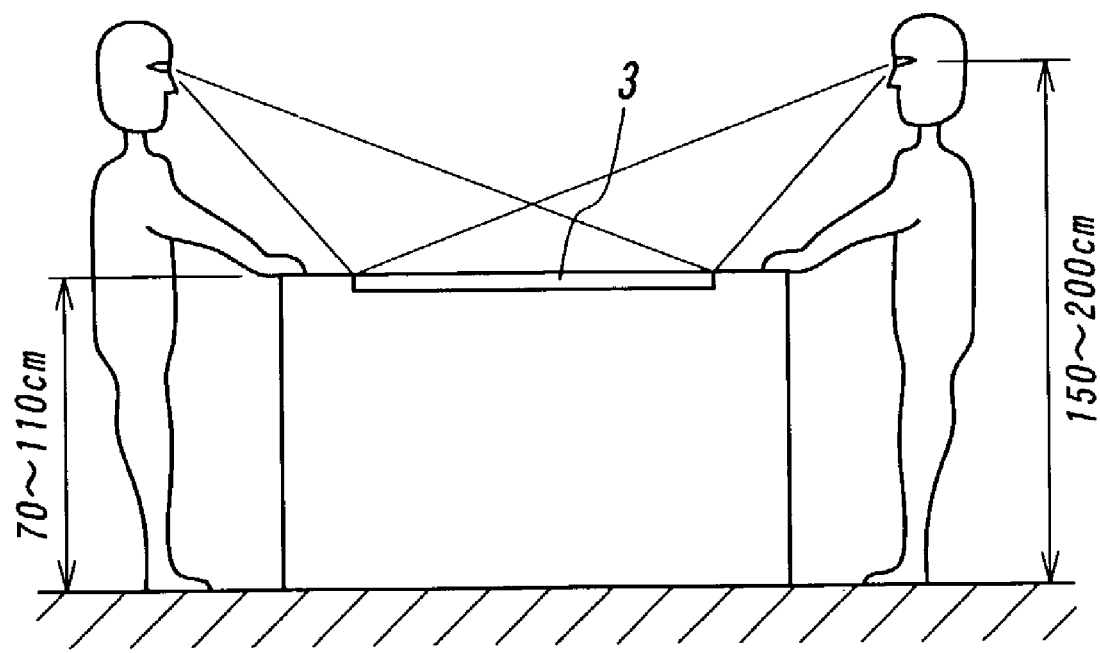
FIG. 2 is a view illustrating the positional relation between the viewer and the screen in the table type display device of the first embodiment.

The table type display device according to the present embodiment is constituted in such a manner that for example, the side of the table surface formed in the upper part of the device (right and left directions shown in figure) is about 2000 mm, length (back and forth directions shown in figure) is about 1600 mm, the height of the device (vertical direction shown in Figure) is about 1000 mm, and the size of the screen 3 is about 70 inches. Therefore, the positional relation between the viewer and the screen 3 of the table type display device is as shown in the FIG. 2.

Next, the operation of high resolution display at the time of displaying large screen in the table type display device according to the present embodiment is explained. Moreover, the case that does not perform the overlap display on the screen 3 is explained hereinafter, but in the case of performing the overlap display, "Image processing that connects smoothly the image of the overlap portion" is only added.

First, with the use of an image formation device (not shown), the high resolution display data is formed by dividing the image to be displayed into the number of projectors (division by two in this embodiment), and then respective these high resolution display data are outputted with synchronization of projectors 1L and 1R.

Projectors 1L and 1R which receive the high resolution display data, are located in the casing 4 in such a manner that the projection angle and projection distance shown in FIG. 1 are set, so that the optical paths of respective luminous fluxes to form the images horizontally projected from the projectors 1L and 1R, are upward bent by the reflection mirrors 2L and 2R. Luminous fluxes with bent optical path are projected to the undersurface of screen 3, and are projected to right and left half plane regions of the diffusing screen 8 respectively through the transparent base member 7. As a result, the display of the high resolution twice SXGA can be achieved on the large screen of about 70 inches.

Figure 3:
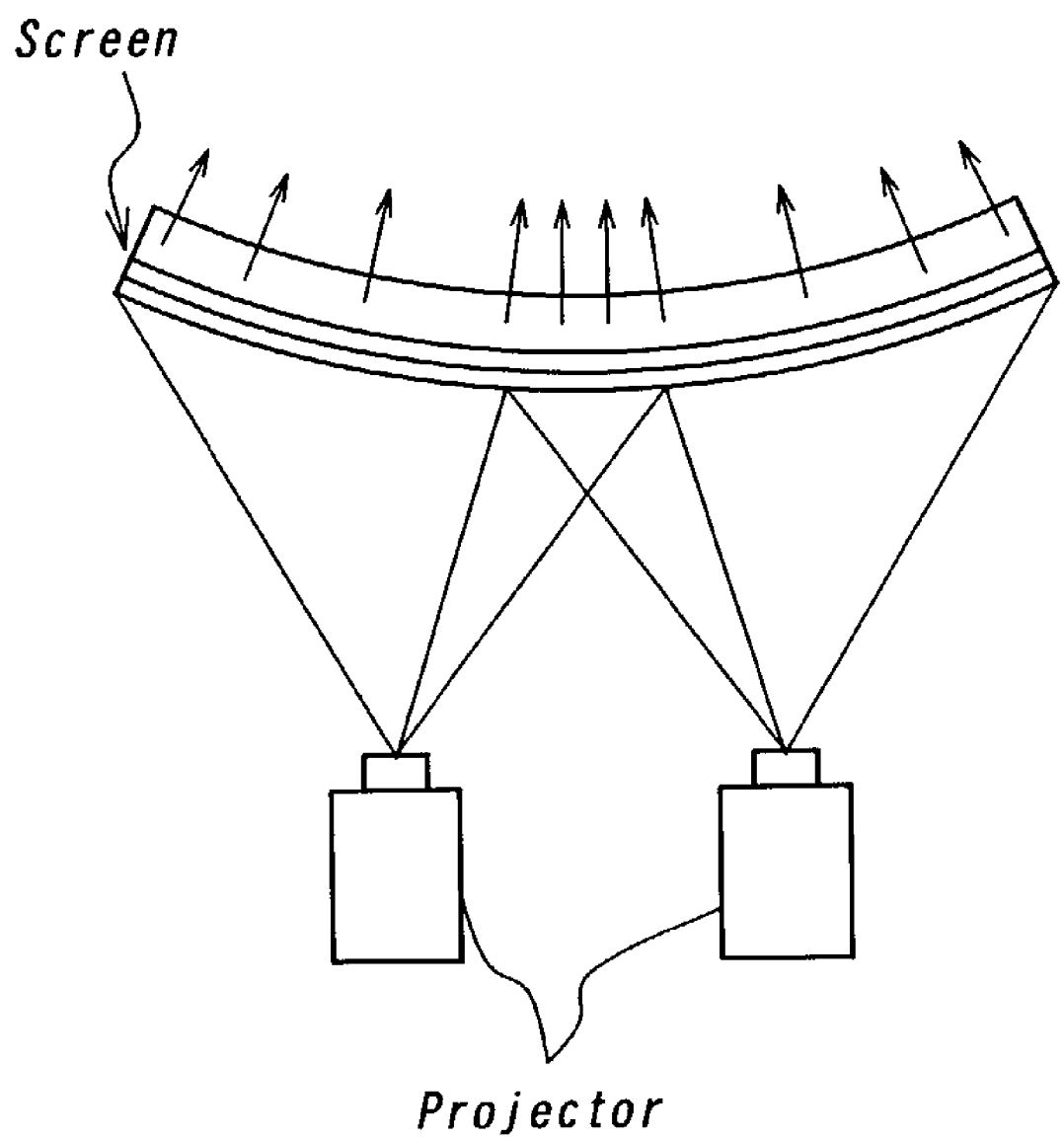
FIG. 3 is a view explaining the reason for using the transparent base member in the table type display device of the first embodiment.

In this case, in the display device described in Japanese Patent Application Opened No. 305079/2000 corresponding to the structure in which the transparent base member 7 is omitted from the screen 3 of the table type display device according to the present embodiment, when the screen bends as shown in FIG. 3, luminous fluxes from right and left projectors are not adjusted as a parallel light, so that the position looking as shadowy is caused since strength of light is different according to the viewing position of the viewer. Therefore, in order to reduce the bending of the screen, the feature of constituting the screen with the use of the transparent base member is necessary.

According to the table type display device of the present embodiment, the screen 3 comprises the transparent base member 7 for reducing the bending of the screen 3 and the diffusing screen 8 for imaging the image, thereby constituting the large screen, so that the screen 3 is not damaged even in the case that the viewer got on the screen 3. Therefore, when large screen display is performed by using the screen 3 having a structure with few bending, the high resolution display can be achieved.

Figure 4:
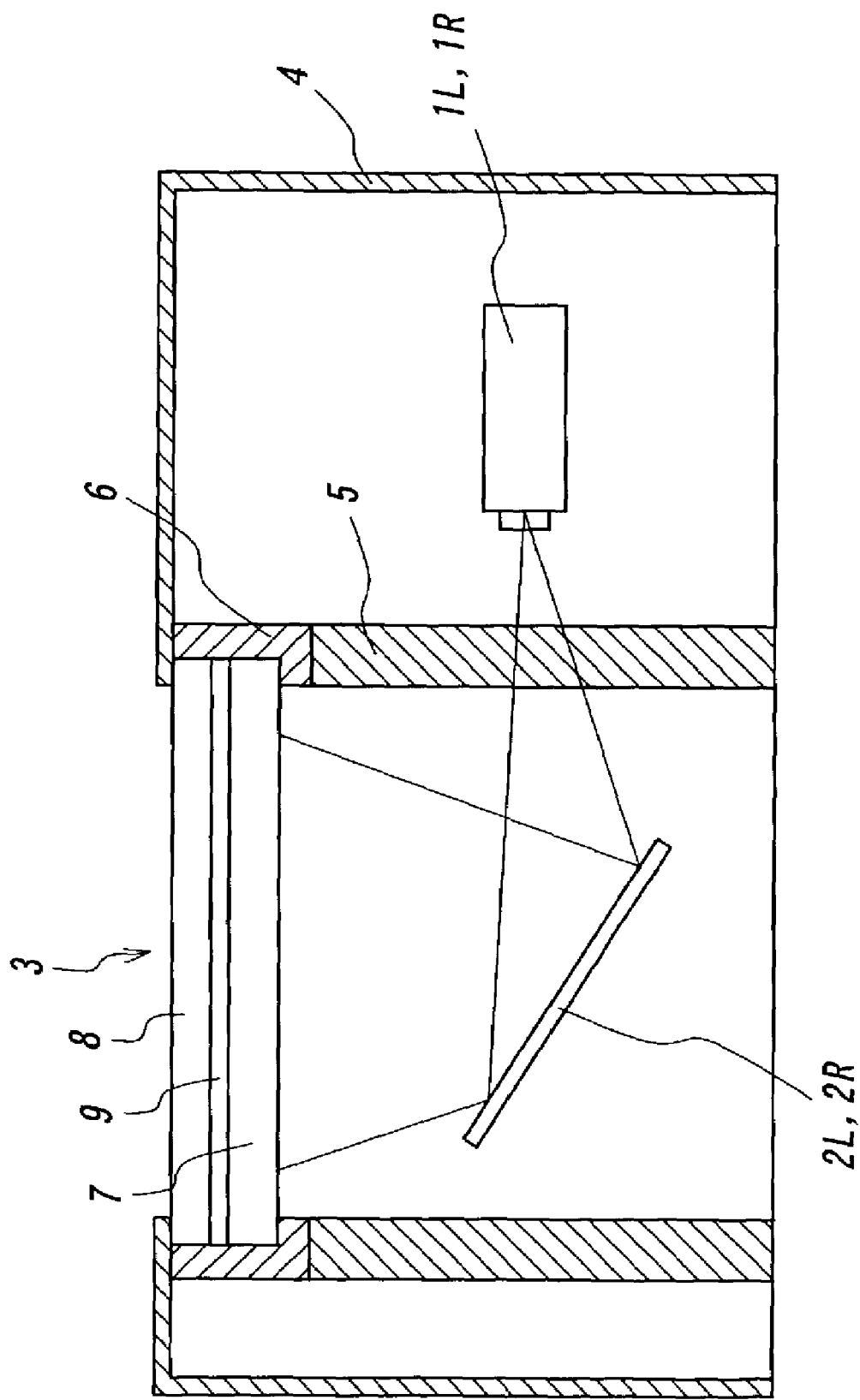
FIG. 4 is a cross-sectional view showing the structure of the table type display device of the second embodiment according to the present invention.

FIG. 4 is a cross-sectional view showing a structure of the table type display device of second embodiment according to the present invention. The table type display device according to this embodiment is made a change to the table type display device of first embodiment shown in FIG. 1 so as to make the construction of the screen 3 changed, and the portions other than the above are constituted same as the first embodiment.

That is, the screen 3 of the present embodiment is constituted by inserting the optical sheet 9 with the function for making the luminous fluxes projected from respective projectors 1L and 1R uniform, between the transparent base member 7 for reducing the bending of the screen and the diffusing screen 8 for imaging the image. Any one of the Fresnel lens, the Lenticular sheet, the beads screen or the holography screen can be used as the optical sheet 9. Moreover, in the present embodiment, the image is made easy to see further more by performing the overlap display on the screen 3 and by performing "Image processing that connects smoothly the image of the overlap portion".

Figure 5:
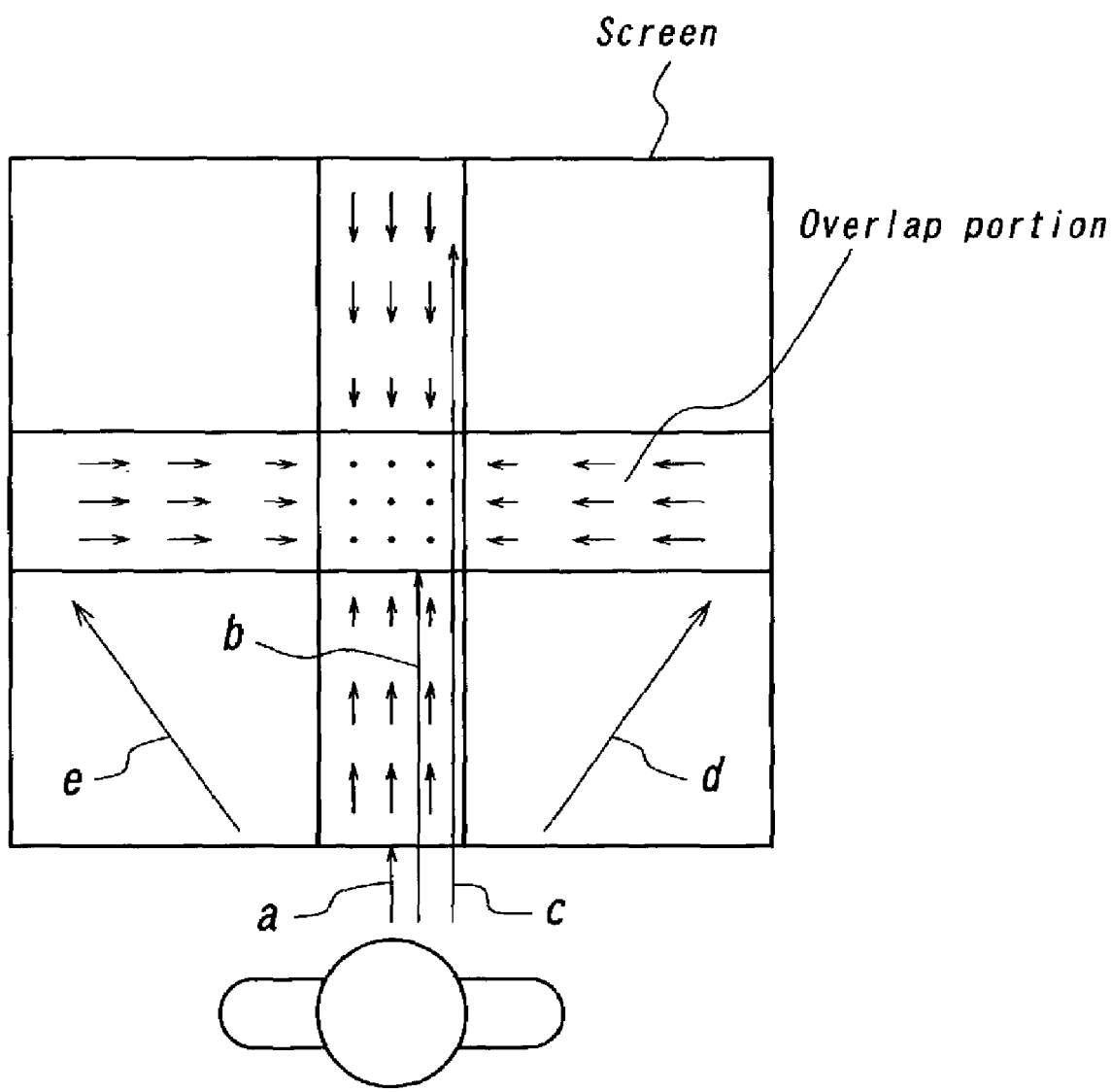
FIG. 5 is a view explaining the relation between the overlap portion on the screen and the visual performance when the overlap display is performed in the table type display device.

In case of performing the overlap display, for example, as shown in FIG. 5, the overlap portions are caused in the shown vertical directions and the right and left directions when luminous fluxes from four projectors are projected. At this time, in case of looking forward straight as shown by arrows a, b, and c, the viewer standing at the shown position looks the near side dark, and the far side dark, therefore, brightness becomes a<b<c. Moreover, according to viewing angle, in case of looking the right and left as shown by arrows d and e, the screen looks bright, and in case of looking straight as shown by the arrow b, the screen looks dark, therefore, brightness becomes b<d and b<e.

Figure 6:
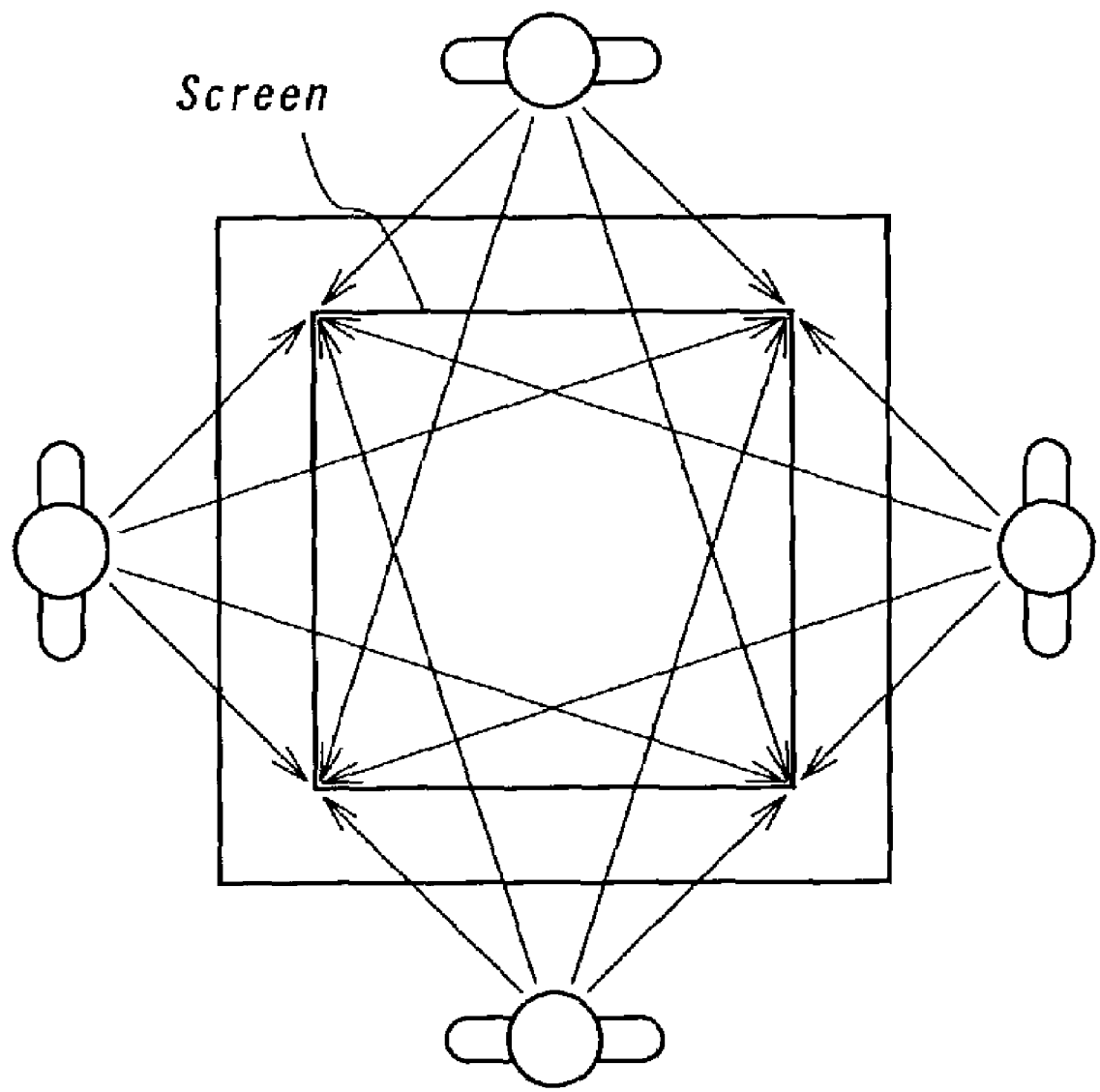
FIG. 6 is a view explaining the same field characteristic demanded to the table type display device of large screen.
Figure 7A:
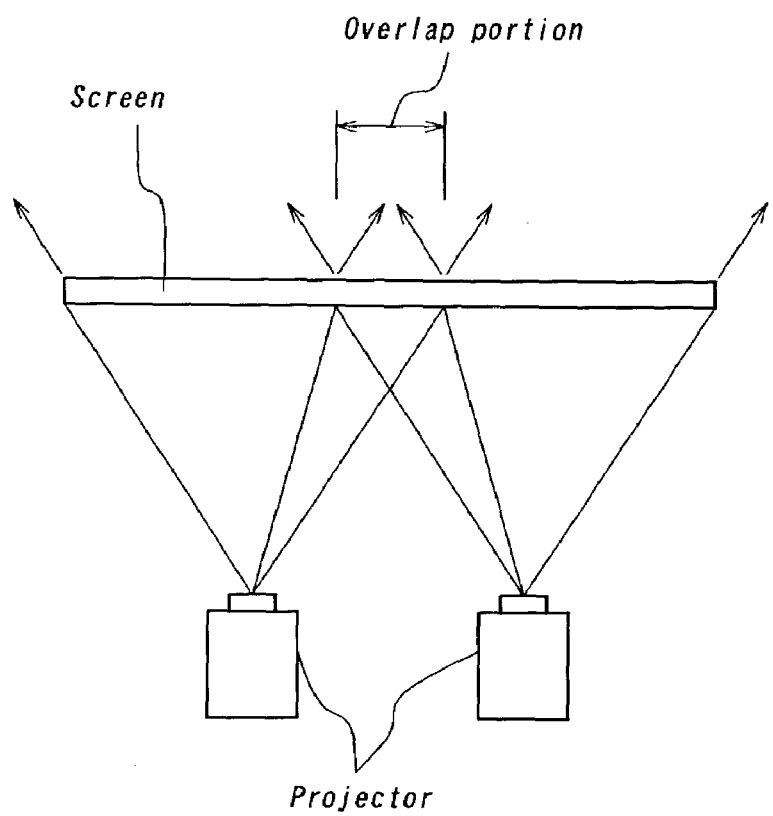
FIGS. 7 (a) and (b) are views illustrating the state of the luminous flux emanated from the screen, in the case that does not use an optical sheet for screen of the table type display device, and in the case that uses the optical sheet for screen of the table type display device, respectively.
Figure 7A:
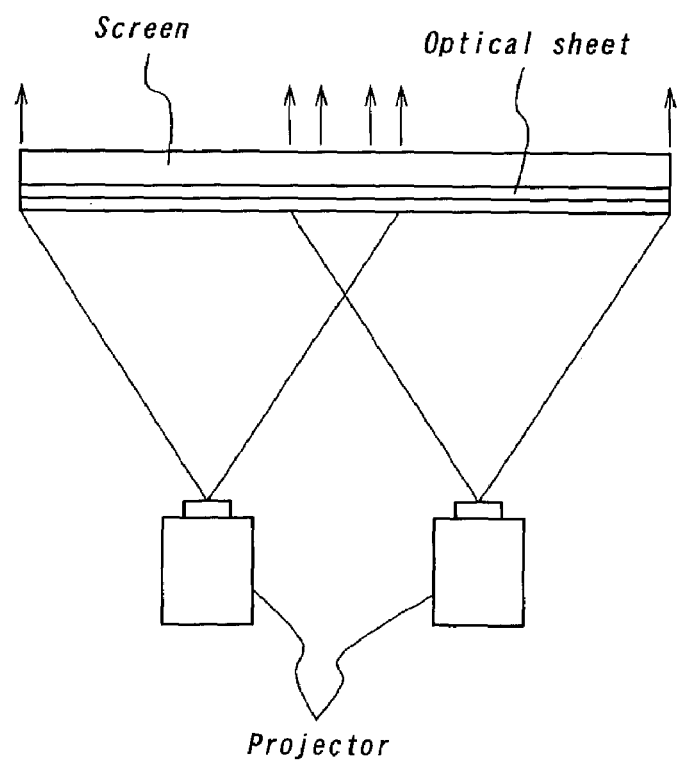

By the way, in case of constituting the table type display device of the large screen as in the present embodiment, when viewers standing at various positions as shown in FIG. 6, see the display image on the screen, it is required that respective viewers have the same field angle characteristic. However, in case of performing the overlap display as shown in FIG. 7 (a), if it is constituted in such a manner that luminous fluxes from respective projectors are projected on the screen directly, in the overlap portion, the view point changes by observer's viewing angle, so that it will contradict the demand. Then, in this embodiment, as shown in FIG. 7(b), the device is constituted in such a manner that luminous flux emanating the screen becomes substantially vertical to the screen surface (in other words, becomes substantially parallel light), by using an optical sheet for making luminous fluxes substantially uniform as a component of the screen.

According to the table type display device of the present embodiment, the optical sheet 9 is inserted between the transparent base member 7 and the diffusing screen 8, the luminous flux incident on the diffusing screen 8 from the oblique direction emanates to the direction substantially orthogonal to the screen, therefore, the luminous flux projected on the diffusing screen 8 is made uniform substantially, so that the connecting portion of right and left half plane regions becomes dark, and the connection becomes unremarkable, and thus the view of the image does not change at different standing positions of the viewer. Therefore, when the large screen display is performed by using the screen 3 having the structure with few bending, the high resolution display, in which connection is unremarkable and it is easy to see, can be achieved.

FIG. 8 is a cross-sectional view showing a structure of the table type display device of third embodiment according to the present invention. The table type display device according to this embodiment is made a change to the table type display device of second embodiment shown in FIG. 4 so as to make the construction of the screen 3 changed, and the portions other than the above are constituted same as the second embodiment.

That is, in this embodiment, as an optical sheet being the component of the screen 3, a sheet constituted by stacking a lenticular sheet 9-1 formed by arranging lens to one direction (X direction in FIG. 8) in two dimensional directions of display surface of the diffusing screen 8, and a lenticular sheet 9-2 formed by arranging lens to the other direction (Y direction in FIG. 8) of two dimensional directions of the diffusing screen 8, is used, instead of one optical sheet. Moreover, in the present embodiment, it becomes easy to see the image further more, by performing the overlap display on the screen 3, and by performing "Image processing that connects smoothly the image of the overlap portion"

According to the table type display device of the present embodiment, the optical sheet 9 consisting of lenticular sheets 9-1 and 9-2 is inserted between the transparent base member 7 and the diffusing screen 8, the luminous flux incident on the diffusing screen 8 from the oblique direction emanates to the direction substantially orthogonal to the screen, therefore, the luminous flux projected on the diffusing screen 8 is made uniform substantially, so that the connecting portion of right and left half plane regions becomes dark, and the connection becomes unremarkable, and thus the view of the image does not change at different standing positions of the viewer. Therefore, when the large screen display is performed by using the screen 3 having a structure with few bending, the high resolution display, in which connection is unremarkable and it is easy to see, can be achieved.

Figure 9:
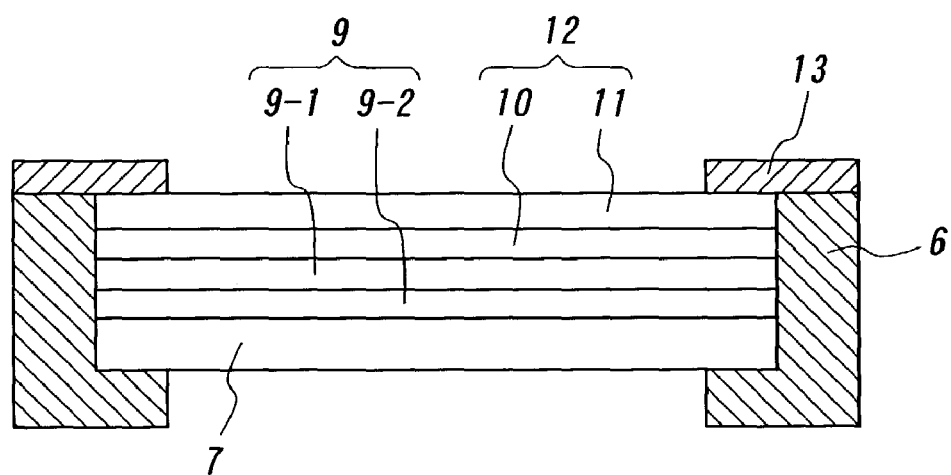
FIG. 9 is a cross-sectional view showing the structure of the principal portion of the table type display device of fourth embodiment according to the present invention.

FIG. 9 is a cross-sectional view showing a structure of the principal portion of the table type display device of fourth embodiment according to the present invention.

The table type display device according to this embodiment is made a change to the table type display device of third embodiment shown in FIG. 8 so as to make the construction of the screen 3 changed, and the portions other than the above are constituted same as the third embodiment.

That is, in this embodiment, instead of one piece diffusing screen 8 used to constitute the top of the screen 3 in the third embodiment, the screen structure is changed to use a diffusing screen 12 consisting of a transparent diffusing sheet 10 for imaging the image and a cover glass 11 for guarding the diffusing sheet 10, and to add a suppression board 13 to the upper portion of the periphery of the cover glass 11. Moreover, in this embodiment, though the optical sheet 9 consisting of two lenticular sheets 9-1 and 9-2 as shown in FIG. 9, is used as an optical sheet 9, one piece optical sheet 9 may be used instead thereof.

Figure 10:
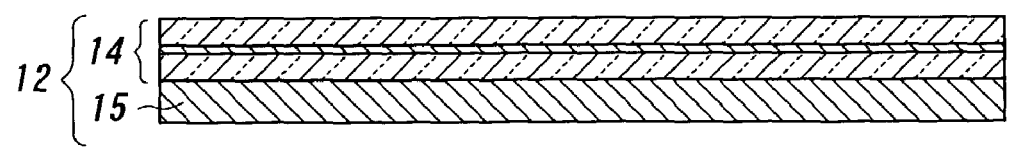
FIG. 10 is a view showing the modified embodiment of the diffusing screen of the table type display device according to a fourth embodiment.

In addition to the structure in which the diffusing sheet 10 and the cover glass 11 as shown in FIG. 9 are independently provided, the diffusing screen 12 may be made a structure in which a diffused layer 15 is formed to the undersurface of a laminated glass 14 used as the cover glass 11 as shown in FIG. 10. In addition, though it is not shown in Figure here, the diffused layer is formed to the undersurface of the thermal reinforced glass used as the cover glass 11.

According to the table type display device of the present embodiment, in addition to obtain the effect similar to the third embodiment, the diffusing screen 12 consisting of the diffusion sheet 10 and the cover plate 11 was used instead of one piece diffusing screen 8, so that the manufacturing cost of the screen 3 can be reduced considerably compared with the case utilizing the sapphire glass etc. having high hardness. In addition, the cover plate 11 was provided on the surface of the screen 3, so that the surface of the screen can be prevented from becoming dirty and being damaged.

Figure 11A:
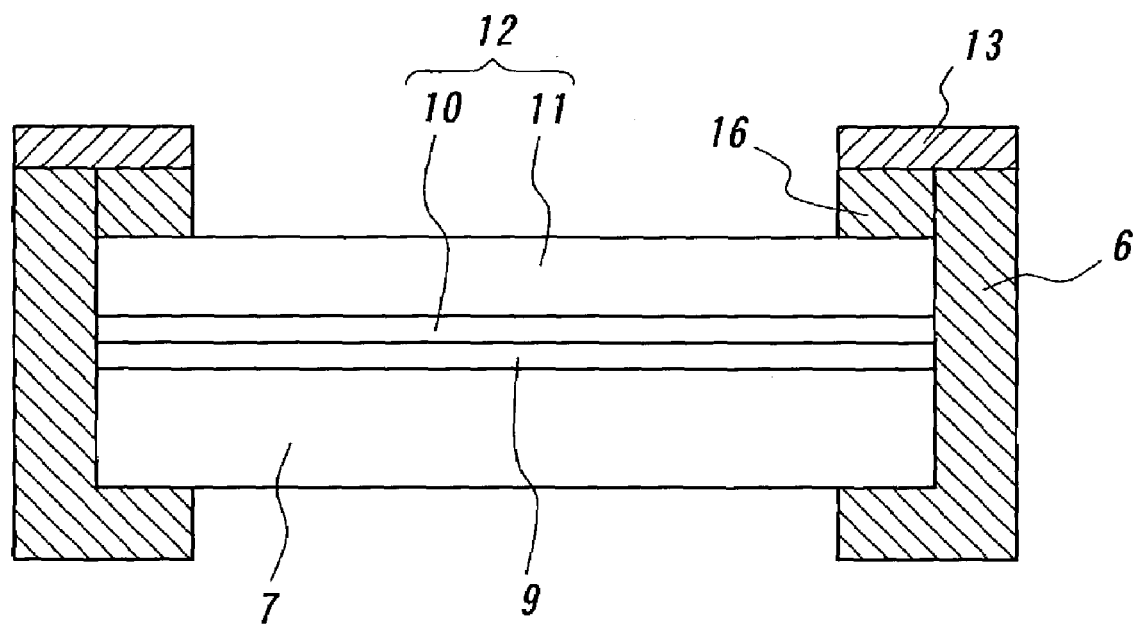
FIGS. 11 (a) and (b) are the cross-sectional view showing the structure of the principal portion of the table type display device of fifth embodiment according to the present invention and view showing the exchangeable portion of the screen thereof, respectively.
Figure 11B:
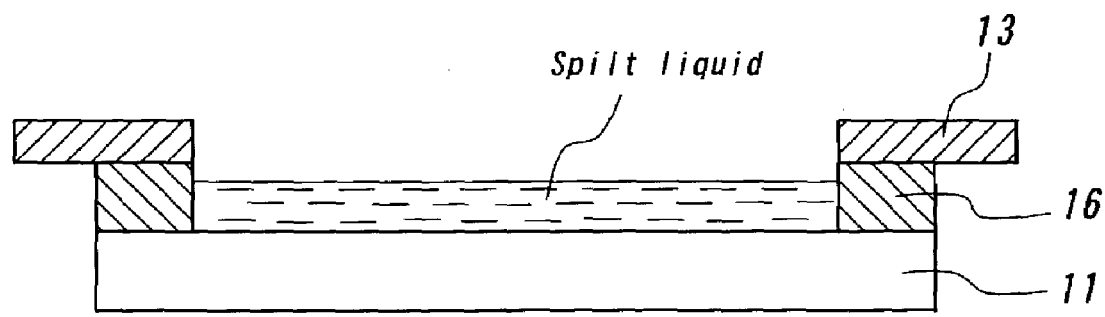

FIGS. 11(a) and 11(b) are a cross-sectional view showing the structure of the principal portion of the table type display device of fifth embodiment of the present invention and a view showing the exchangeable portion of the screen, respectively. The table type display device according to this embodiment is made a change to the table type display device of fourth embodiment shown in FIG. 9 so as to make the construction of making a part of the screen 3 exchangeable, and the portions other than the above are constituted same as the fourth embodiment (using one piece of the optical sheet 9).

That is, in this embodiment, as shown in FIG. 11(a), by providing a rubber sheet 16 between cover glass 11 and the suppression board 13, the cover glass 11 can be exchanged and unitized by cementing contact portion of upper surface of the rubber sheet 16 and undersurface of the suppression board 13, Contact portion of undersurface of the rubber sheet 16 and upper surface of the cover glass 11, and contact portion of outer peripheral surface of the rubber sheet 16 and inner periphery surface of the screen frame 6, by the sealing material respectively. Moreover, as the optical sheet 9, one piece of the optical sheet 9 is used in FIG. 11(a), but instead thereof, the optical sheet 9 consisting of two lenticular sheets 9-1 and 9-2 as shown in FIG. 9 may be used. Moreover, a seal member may be used instead of the rubber sheet.

According to the table type display device of the present embodiment, in addition to obtain the effect similar to the fourth embodiment, as shown in FIG. 11(b), in case of spilling the liquid on the cover glass 11 constituting the diffusing screen 12, the effect of effectively preventing the liquid from being turned under the diffusing screen 12, can be obtained. In addition, it is a structure, in which cover glass 11 can be exchanged alone, so that the effect of achieving excellent maintenance is obtained.

Figure 12:
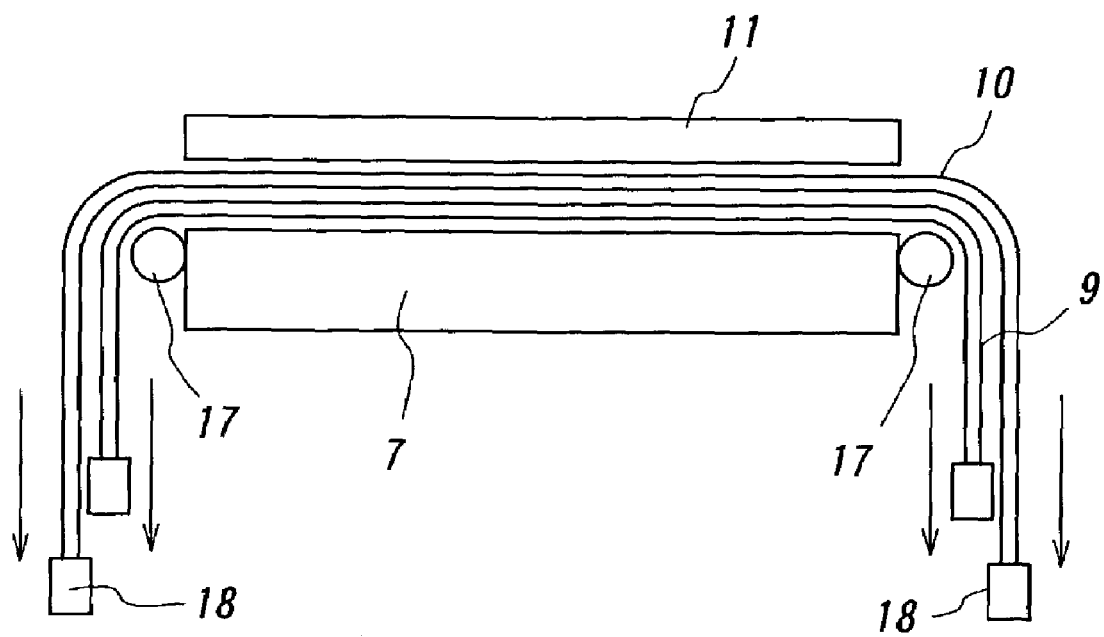
FIG. 12 is a view showing the structure of the principal portion of the table type display device of sixth embodiment according to the present invention.

FIG. 12 shows a structure of the principal portion of the table type display device of the sixth embodiment according to the present invention. The table type display device according to this embodiment is made a change to the table type display device (using one piece of the optical sheet 9) of fourth embodiment shown in FIG. 9 so as to make the diffusing sheet 10 and the optical sheet 9 being the constructional element of the screen 3 predetermined tension, and the portions other than the above are constituted same as the fourth embodiment.

That is, in this embodiment, as shown in FIG. 12, a downward tension corresponding to a weight 18 is applied by extending diffusing sheet 10 and optical sheet 9 to the right and left directions respectively, by folding the extending portion downward through a cylindrical member 17, and by hanging a weight 18 on the right and left bottom portions, respectively.

According to the table type display device of the present embodiment, in addition to obtain the effect similar to the third embodiment, Up the loosing of the diffusing sheet 10 and the optical sheet 9 are prevented, and thus the effect of preventing the entire screen 3 from loosening can be achieved.

Figure 13:
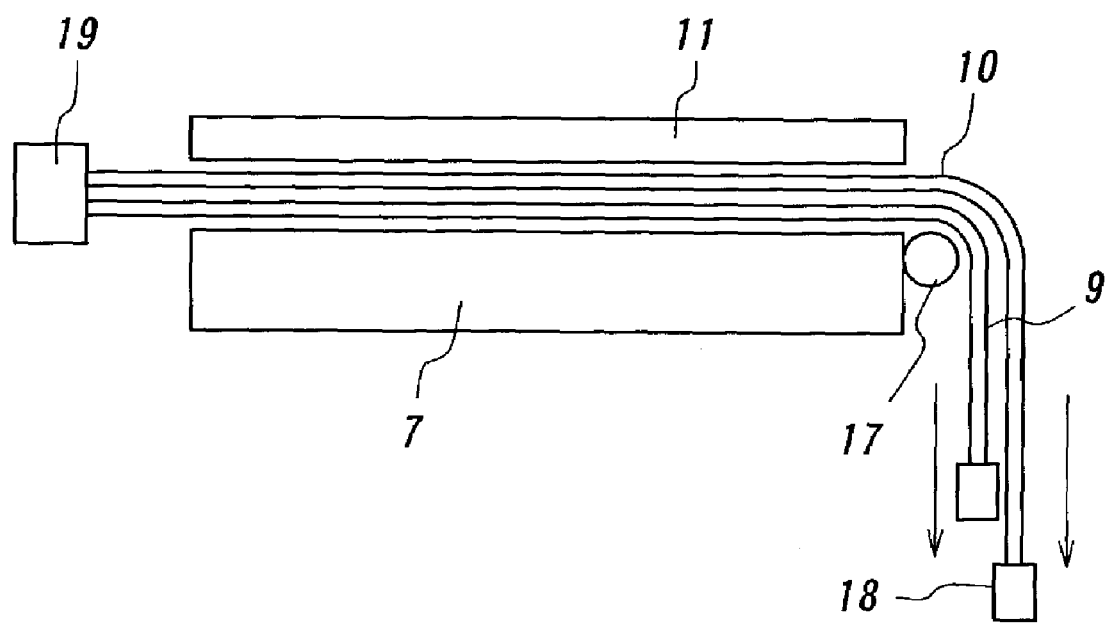
FIG. 13 is a view showing the structure of the principal portion of the table type display device of seventh embodiment according to the present invention.

FIG. 13 shows a structure of the principal portion of the table type display device of the eighth embodiment according to the present invention. The table type display device according to this embodiment is made a change to the table type display device according to sixth embodiment shown in FIG. 12, in such a manner that the portions extending to the shown right and left directions of the spread sheet 10 and the optical sheet 9 are made reduced, and the extended portions are fixed by a sheet stopper 19 and the portions other than the above are constituted same as the sixth embodiment.

According to the table type display device of the present embodiment, in addition to obtain the effect similar to the sixth above sixth embodiment, a necessary number of the cylindrical material 17 and the weight 18 becomes half the sixth embodiment, so that the effect of obtaining reduction in costs is achieved.

Figure 14:
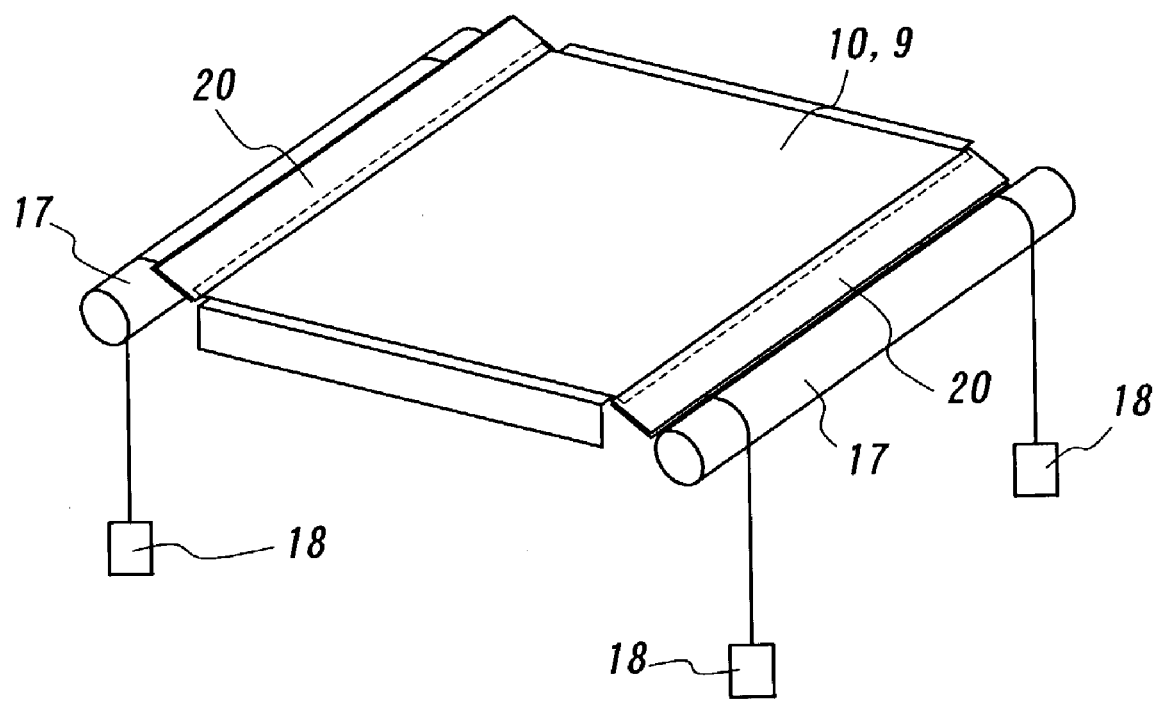
FIG. 14 is a view showing the structure of the principal portion of the table type display device of eighth embodiment according to the present invention.

FIG. 14 shows a structure of the principal portion of the table type display device of the eighth embodiment according to the present invention. The table type display device of the present embodiment is a device changed in such a manner that, to the table type display device of sixth embodiment shown in FIG. 12, the part that extends in the right and left directions of the spread sheet 10 and the optical sheet 9, is made a minimum size, and a weight 18 is hung on the edge of a sandwich member 20 by pinching the extended portion by sandwich member 20 consisting of two board members, and the portions other than the above are constituted same as the sixth embodiment.

According to the table type display device of this embodiment, in addition, the effect similar to the above sixth embodiment can be achieved, and the effect of preventing the stress concentration to right and left edges of the spread sheet 10 and the optical sheet 9 in case of using two weights 18, respectively, can be obtained.

Figure 15:
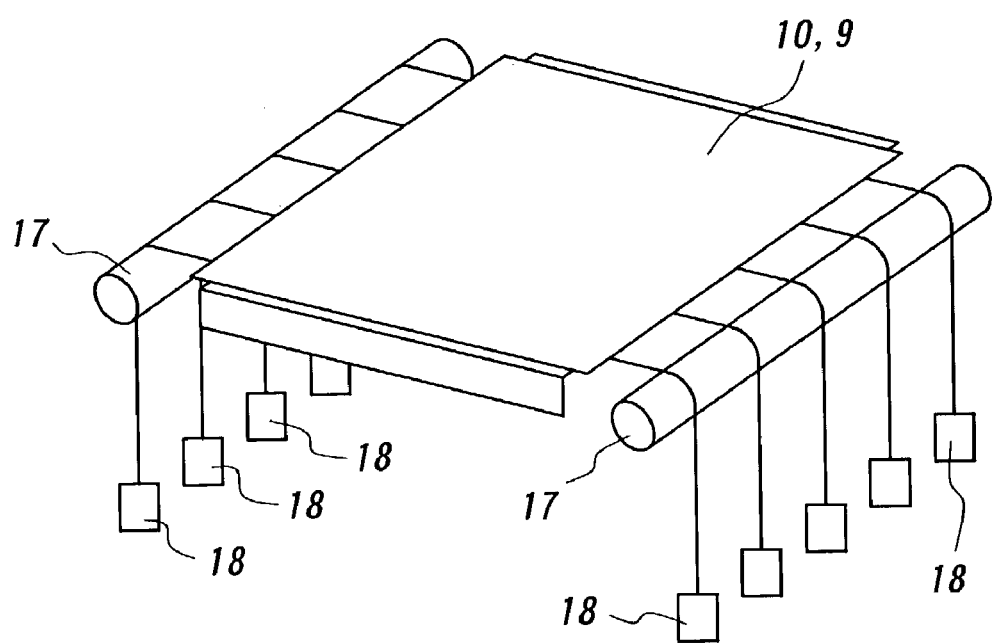
FIG. 15 is a view showing the structure of the principal portion of the table type display device of ninth embodiment according to the present invention.

FIG. 15 shows the structure of the principal portion of the table type display device according to the ninth embodiment of the present invention. The table type display device according to this embodiment is changed in such a manner that the parts extending to the right and left directions of the spread sheet 10 and the optical sheet 9, are made a minimum size for the table type display device according to sixth embodiment shown in FIG. 12, and a number of weights 18 (5 pieces in the shown embodiment respectively) are hung on the extended portions, directly, and the portions other than the above are constituted same as the sixth embodiment.

According to the table type display device of the present embodiment, the effect similar to the sixth embodiment can be obtained and the structure thereof can be simplified.

Figure 16:
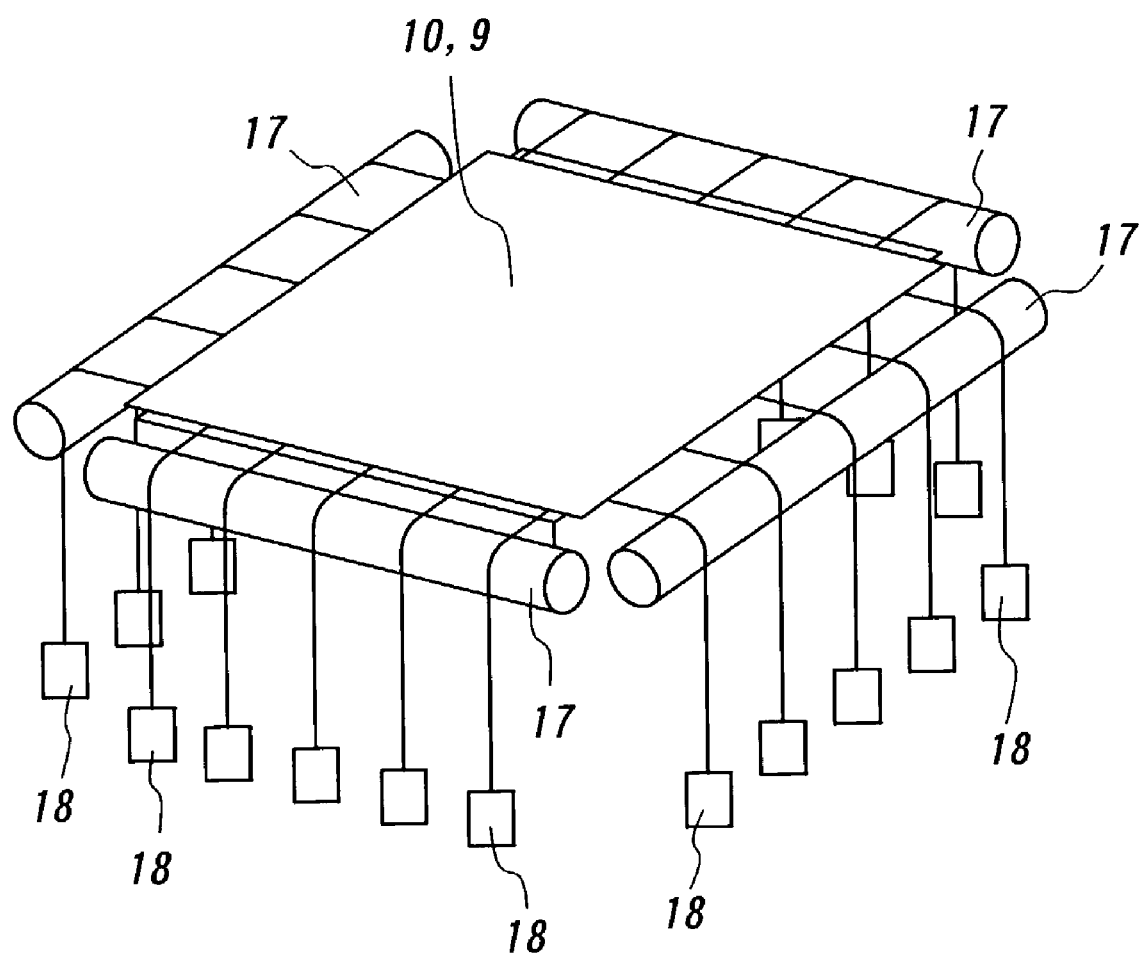
FIG. 16 is a view showing the structure of the principal portion of the table type display device of tenth embodiment according to the present invention.

FIG. 16 shows a structure of the principal portion of the table type display device of the tenth embodiment according to the present invention. The table type display device according to this embodiment is made a change to the table type display device of sixth embodiment shown in FIG. 12 constituted in such a manner that the tension is applied to the two arms in the right and left of the spread sheet 10 and the optical sheet 9, so as to apply the tension to the four arms in the front, back, left and right of the spread sheet 10 and the optical sheet 9 shown in FIG. 16, and the portions other than the above are constituted same as the sixth embodiment.

According to the table type display device of the present embodiment, the effect similar to the sixth embodiment can be obtained and the loose prevention function of the screen comes to be strengthened further.

Figure 17:
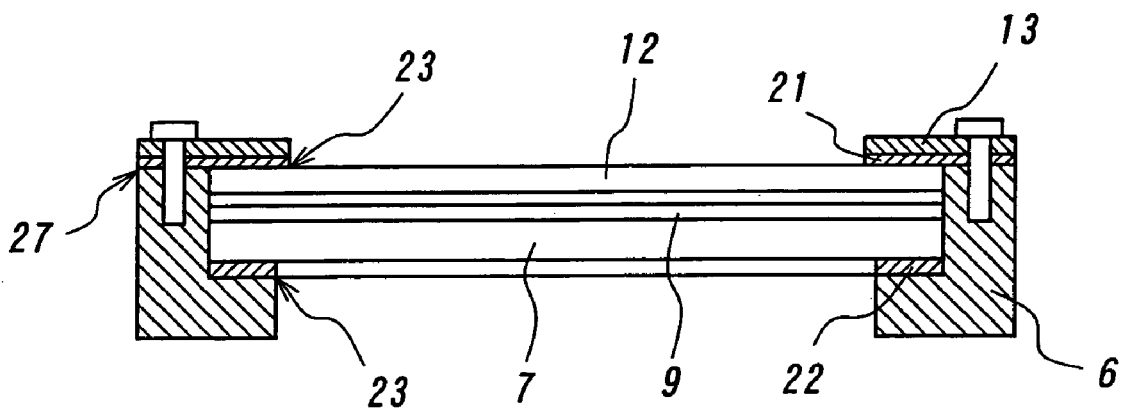
FIG. 17 is a view showing the structure of the principal portion of the table type display device of eleventh embodiment according to the present invention.
Figure 18:
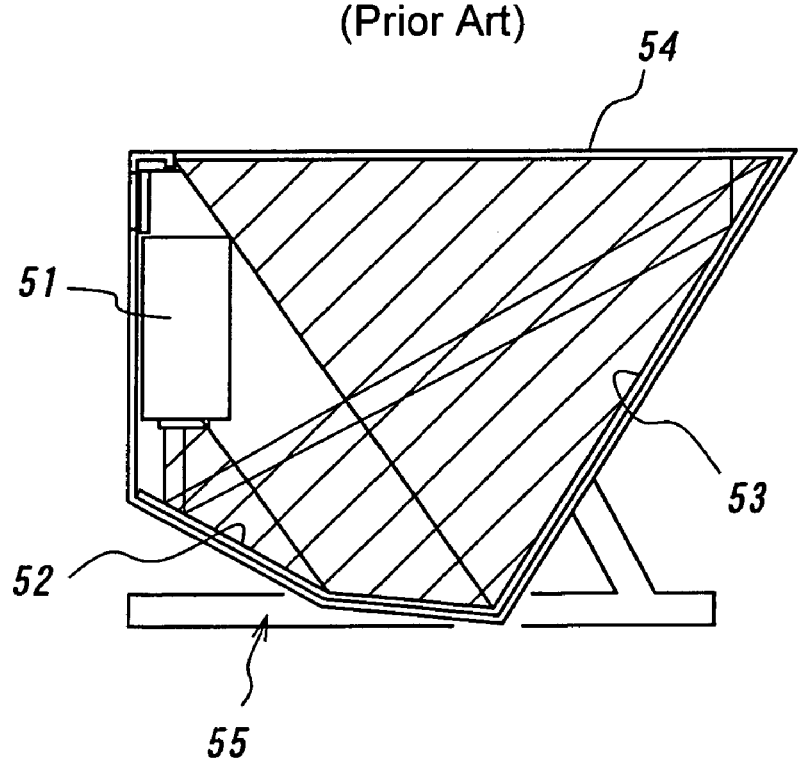
FIG. 18 is a view explaining the prior art.

FIG. 17 shows a structure of the principal portion of the table type display device of the eleventh embodiment according to the present invention. The table type display device according to this embodiment is made a change to the table type display device of fifth embodiment shown in FIG. 11 so as to make the optical sheet 9 a sealed structure, and the portions other than the above are constituted same as the fifth embodiment.

That is, in this embodiment, as shown in FIG. 17, a rubber 21 is provided between the upper surface of the diffusing screen 12 and the undersurface of the suppression board 13, and a rubber 22 is provided between a right and left edge under the transparent base member 7 and upper surface of the screen frame 6, and then a contact section of edge surface of the rubber 21 and upper surface of the diffusing screen 12, a contact section of the undersurface of the rubber 21 and upper surface of the screen frame 6, and a contact section of upper surface of the rubber 22 and undersurface of the transparent base member 7 are cemented respectively by an adhesive seal 23, so that the optical sheet 9 is made a complete sealed structure.

According to the table type display device of this implement, in addition that the effect similar to the fifth embodiment can be obtained, the effect of effectively preventing expansion and contraction of an optical sheet due to the moisture absorption thereof in case of using the sheet made of the acrylic fiber as an optical sheet, can be obtained.

Here, the thickness of the diffusing screen of the transparent base member (base glass), the cover glass and the glass base in respective embodiments is explained.

The image projected from the projector through the reflection mirror reaches an optical sheet by the passage of the base glass. At this time, the direction of projection of the image changes only by the refraction index of the glass when the image passes through the base glass, but the imaging is not performed in the base glass portion, so that even though the direction of the projection changes if the projector is adjusted so as to focus the image on the diffused layer, the influence by the refraction index of the above glass disappears. Therefore, the thickness of the base glass can be arbitrarily selected, and can be decided based on "Strength when the person has gotten on up by the error" or the like which is required to the table. For example, in the case of screen of about 70 inches, assuming that the load of about 100 kg is received to the center of the screen, if the laminated glass of the thickness of about 6 mm+about 6 mm is used, the glass having thickness below the allowable stress can be selected.

On the one hand, the thickness of the glass of the diffused layer on the optical sheet has a problem that When the direction of light changes, it becomes difficult to see the image due to the refraction index of the glass, since the image after imaging passes through the glass. In the display device where the screen is located vertically, the screen is often seen in the front or the front near, so that the influence of refraction index is a little, but in the case of the table type display device, the screen is always seen from the direction of the oblique, so that the far side of the screen is susceptible to the influence of refraction index, as compared with the near side of the screen, and as a result, the image is distorted. Moreover, even though the rule is put on the glass, and the case that the length of the said picture data is also measured, the length is hardly measured since the imaged plane is separated and the image refracts to see. Up to now, when the measurement of length to several thicknesses of the glass are tried, the thickness of glass layer on the surface has a limit of about 12 mm, and the result of measurement is that the thinner, the better. There is a problem that the device cannot be manufactured by the screen having the size of about 70 inches when the glass is too thin, too, so that it was identified that the laminated glass of about 2 mm+about 2 mm–about 6 mm+about 6 mm is suitable as the glass of the top layer. Moreover, even in the case of a thermal reinforced glass and an acrylic, similar thickness is suitable.

In the above described embodiment, though the present invention was explained with a plurality of projectors and an a plurality of reflection mirrors, the present invention is not limited to these embodiments, and thus the present invention can be applied to a single projector and a single reflection mirror.

What is claimed is:

1. A table type display device comprising:
   a plurality of projectors for projecting light to form an image;
   a plurality of reflection mirrors for reflecting the light projected from the plurality of projectors; and
   a horizontally installed screen onto which the light reflected by the plurality of reflection mirrors is projected, the plurality of reflecting mirrors projecting the light onto respective predetermined regions of the screen;
   wherein the screen comprises a transparent base member for reducing flexure of the screen, and a diffusing screen for imaging the image; and
   wherein the predetermined regions comprise at least one overlapping portion at which at least two predetermined regions overlap.

2. The table type display device as claimed in claim 1, wherein the transparent base member comprises a laminated glass.

3. The table type display device as claimed in claim 2, wherein the diffusing screen comprises a diffused layer installed in the laminated glass.

4. The table type display device as claimed in claim 1, wherein the transparent base member comprises a thermal reinforced glass.

5. The table type display device as claimed in claim 4, wherein the diffusing screen comprises a diffused layer installed in the thermal reinforced glass.

6. The table type display device as claimed in claim 1, wherein the transparent base member comprises an acrylic plate.

7. The table type display device as claimed in claim 6, wherein the diffusing screen comprises a diffused layer installed in the acrylic plate.

8. A table type display device comprising:
   a plurality of projectors for projecting light to form an image;
   a plurality of reflection mirrors for reflecting the light projected from the plurality of projectors; and
   a horizontally installed screen onto which the light reflected by the plurality of reflection mirrors is projected, the plurality of reflecting mirrors projecting the light onto respective predetermined regions of the screen;
   wherein the screen comprises:
      a transparent base member for reducing flexure of the screen;
      an optical sheet for making the light passing therethrough substantially uniform; and
      a diffusing screen for imaging the image; and
   wherein the predetermined regions comprise at least one overlapping portion at which at least two predetermined regions overlap.

9. The table type display device as claimed in claim 8, wherein the optical sheet comprises a Fresnel lens.

10. The table type display device as claimed in claim 8, wherein the optical sheet comprises a lenticular sheet.

11. The table type display device as claimed in claim 8, wherein the optical sheet comprises:
   a first lenticular sheet comprising lenses arranged in a first direction in two dimensional directions of a display surface of the diffusing screen; and
   a second lenticular sheet comprising lenses arranged in a second direction of the two dimensional directions of the display surface.

12. The table type display device as claimed in claim 8, wherein the optical sheet comprises a beads screen.

13. The table type display device as claimed in claim 8, wherein the optical sheet comprises a holography screen.

14. The table type display device as claimed in claim 8, wherein the optical sheet is sealed between the transparent base member, the diffusing screen and a screen frame.

15. A table type display device comprising:
   a plurality of projectors for projecting light to form an image;
   a plurality of reflection mirrors for reflecting the light projected from the plurality of projectors; and a horizontally installed screen onto which the light reflected by the plurality of reflection mirrors is projected, the plurality of reflecting mirrors projecting the light onto respective predetermined regions of the screen;

wherein the screen comprises:
- a transparent base member for reducing flexure of the screen;
- an optical sheet for making the light passing therethrough substantially uniform;
- a diffusing screen for imaging the image;
- a transparent spread sheet for imaging the image; and
- a cover plate for guarding the spread sheet; and wherein the predetermined regions comprise at least one overlapping portion at which at least two predetermined regions overlap.

16. The table type display device as claimed in claim 15, wherein the cover plate comprises a laminated glass.

17. The table type display device as claimed in claim 15, wherein the cover plate comprises a thermal reinforced glass.

18. The table type display device as claimed in claim 15, wherein the cover plate comprises an acrylic plate.

19. The table type display device as claimed in claim 15, wherein a predetermined amount of tension is applied on the optical sheet and the diffusing screen.

20. The table type display device as claimed in claim 15, wherein the cover plate is arranged on the top of the table type display device, and is cemented by a sealing material to a screen frame for holding other components of the table type display device which are arranged below the cover glass.

21. The table type display device as claimed in claim 15, wherein the cover plate is independently removable from the table type display device.

* * * * *